United States Patent Office 3,393,946
Patented July 23, 1968

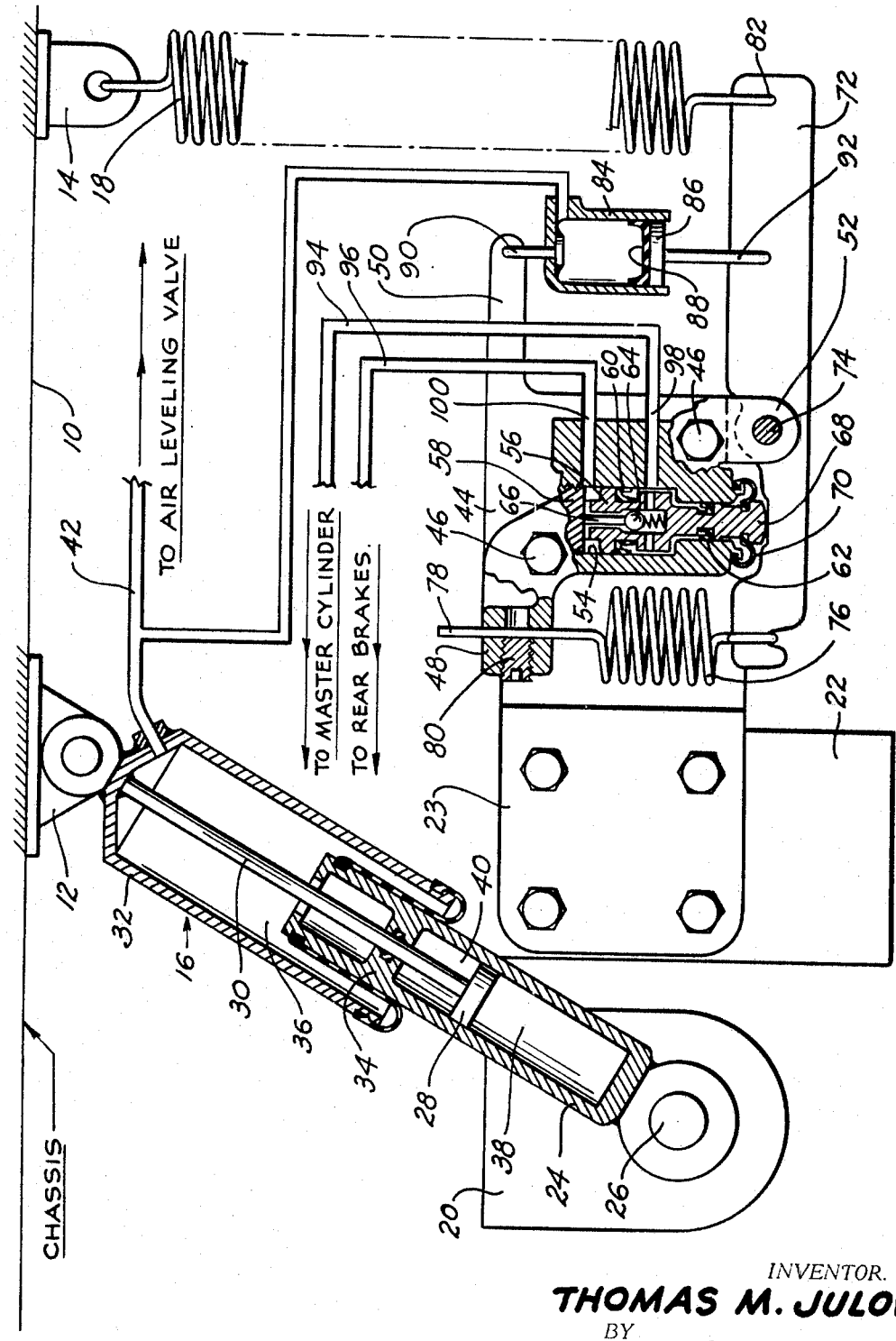

3,393,946
LOAD PROPORTIONING VALVE
Thomas M. Julow, South Bend, Ind., assignor to The
Bendix Corporation, a corporation of Delaware
Filed July 14, 1967, Ser. No. 653,418
7 Claims. (Cl. 303—22)

ABSTRACT OF THE DISCLOSURE

A valve having a housing attached to a vehicle chassis or axle which is operated by a lever fulcrumed to the valve housing and provided with a spring preload means which lever is operated by variances in distance between the chassis and the axle with a means to maintain a proper preload on the lever comprising an actuator connected between the valve housing and the lever which is sensitive to a pressure within a means connecting the chassis and the axle.

Summary

The concept of distributing or apportioning the braking forces as a function of the load for a vehicle is already known per se. The U.S. Patent No. 3,191,999 patented on June 9, 1965, illustrates an arrangement incorporating a valve within a housing that is affixed to the axle of a vehicle and operated by a lever connected to the chassis by a spring with a preload means between the valve housing and the lever. However, in these systems there is no means to adjust the preload connection in accordance with the adjusting of the level of the vehicle which is becoming an increasing effort among vehicle manufacturers in order to maintain proper headlight adjustments, driver visibility, etc.

Thus, it is a principal object of this invention to incorporate into such prior art systems a means to permit the load sensing brake proportioning valve operation regardless of the leveling adjustments between the chassis and the axle of the vehicle.

Drawing description

The drawing shows schematically a load sensitive brake proportioning valve for a vehicle with the valve in cross section as well as the leveling type shock absorber attendant with such vehicles.

Detailed description

With reference to the drawing, the vehicle chassis 10 has attached to it mounting brackets 12 and 14 to which are attached a shock absorber 16 and a spring 18. The axle (not shown) of the vehicle has mounted to it a spring shackle 20 and a bracket 22. The cylinder 24 of the shock absorber is mounted by means of a pin or bolt 26 to the shackle 20. This shock absorber comprises a piston 28 having orifices (not shown) for the passage of fluid from one side of the piston to dissipate the kinetic energy into heat, as will be understood by those skilled in the art. The piston 28 is attached to a rod 30 affixed to the upper housing 32 of the shock absorbers 16, and a partition 34 is arranged within the cylinder 24 in order to separate the air leveling chamber 36 from the hydraulic fluid chambers 38 and 40 above and below the piston 28.

The chamber 36 is connected by means of a conduit 42 to an air leveling valve (not shown) which is operatively arranged between a fluid pressure source and the chamber 36 and either manually or automatically controlled, as will be understood by those skilled in the art, to regulate the height of the vehicle chassis whereby the attitude of the vehicle may be maintained level regardless of the load therein.

To the bracket 22 about the vehicle axle a valve housing 44 is bolted as by the bolts 46. The valve housing has at least three cars 48, 50 and 52. The housing is preferably cast to have an internal bore within which a differential area piston valve 56 is reciprocally arranged after which a plug 58 is sealingly threaded within the bore 54 to close same. The piston 56 has areas corresponding to the diameter of the seals 60 and 62, and is provided with an internal bore that terminates in radial passages within which a ball valve 64 is spring biased to operatively engage a stem 66 depending from the plug 58. The piston valve 56 terminates in valve body 44 about which a rubber boot 70 is provided to prevent contaminants from entering the bore 54 thereat.

After the assembly of the piston valve 56 a lever 72 is pinned to the ear 52, as by a pin or bolt 74 to be fulcrumed about this ear. The lever projects to the left beyond the valve housing or body 44 to permit the attachment of a spring 76 therewith that has a leg 78 projecting through a drilled opening in the ear 48 and adjustably held thereto by means of a set screw 80. The opposite end of the lever 72 is united with the lowermost end of the spring 18 as at 82. Next an actuator comprised of a cylinder 84 and a piston 86 having a seal 88 is connected between the ear 50 and the lever 72 by means of the rods 90 and 92. In the preferred arrangement the connection between the ear 50 and the lever 72 is substantially equidistant from the fulcrum pin 74 as the connection of the preload spring 76 with the end of the lever 72. The assembly is completed by attaching conduits 94 and 96 to inlet 98 and outlet 100 of the valve body 44. In accordance with the legend on the drawing these conduits, respectively, lead from the master cylinder to the inlet 98 and from the outlet 100 to the rear brake actuators for the vehicle (not shown).

Operation

In operation whenever the master cylinder is actuated to transmit a braking pressure to the brake actuators for the vehicle, it will enter the housing 44 at the inlet 98, flow through the cross drilled passages in the piston 56 about the ball valve 64 and through the outlet 100 through the brakes until sufficient pressure is built up across the area of the piston valve 56 prescribed by the seal 62 in deference to the area of the seal 60 to cause the piston to move outwardly whereupon the ball valve 64 seals the communication therethrough.

As will be appreciated by those skilled in the art to which this invention relates, the braking of the vehicle will bring about a load shift about the vehicle's center of gravity whereby the height between the chassis and the axle will increase, assuming of course, that we are talking about the rear axle, whereby the spring 18 will create a force on the lever 72 to pivot it about its fulcrum pin 74 and thereby modulate the control of the piston valve 56 that was aforementioned. The function of the spring 18 is regulated in the prior art installations solely by the preload spring 76; whereas in the instant application the actuator between the ear 50 and the lever 72 will modulate the effect of the preload spring 76 in accordance with the leveling pressure within the air chamber 36 of the shock absorber 16 so as to reduce or increase the preload on the lever 72 in accordance with the load on the vehicle which will be a proportion of the pressure within the chamber 36.

Claims

Having described an operative construction of my invention, it is now desired to set forth the following claims providing the scope of protection sought in view of this disclosure.

I claim:
1. A pressure proportioning valve having a lever op- erator fulcrumed to a valve body with a spring preload means between the body and the lever operator, which lever is operatively connected to a means to sense variances in height between two structures one of which carries said valve body and characterized by the improvement of a device to vary the spring preload means in accordance with the distance between the structures comprising:

a cylinder;
a piston means in said cylinder;
means to connect said cylinder and piston between said valve body and said lever operator; and
means to provide a fluid pressure into said cylinder which fluid pressure is a reference to the distance separating the structures.

2. The structure of claim 1 wherein the means to connect said cylinder and piston between said valve body and said lever operator includes an ear projecting from said body parallel to said lever operator on the opposite side of the body from the spring preload means.

3. The structure of claim 1 wherein the means to connect said cylinder and piston between said valve body and said lever operator includes an ear projecting from said body parallel to said lever and above same on the opposite side of the body from the spring preload means such that said cylinder and piston approximate the height of said spring preload means and the fulcrum point of said lever operator lies within the distance between said device and said spring preload means.

4. The structure of claim 1 wherein the fulcrum point of said lever operator is substantially equidistant from said spring preload means and said device.

5. The structure of claim 1 wherein the two structures are a vehicle chassis and a vehicle axle and said means to provide a fluid pressure is a shock absorber air chamber having a movable wall means to maintain a predetermined height of said chassis with respect to said axle.

6. For use with a vehicle having means to maintain an even height of its chassis involving pressure actuators operatively arranged in its suspension system, a load sensitive brake proportioning valve comprising:

a housing for said valve having a valve chamber therein within which a differential area valve is operatively arranged between inlet and outlet ports for hydraulic braking pressure, said housing having means to mount it to a means suspended from the chassis, and said housing being further provided with first, second and third ears;
a lever operator fulcrumed to said first ear and operatively connected to said differential area valve to operate same;
a spring adjustably connected to said second ear and one end of said lever to preload the operative connection of said lever with said differential area valve;
a link between said lever and the chassis to position said valve in said valve chamber in accordance with the distance between said chassis and said mass which is proportional to the load of said chassis; and
an actuator between said third ear and said lever to vary the height of said spring preloading said lever, which actuator is operatively connected to said means to maintain an even height of the vehicle chassis so that said lever will move thru the same arc when the vehicle is leveled after loading as it would without leveling.

7. The structure of claim 6 wherein said actuator is positioned substantially the same distance from said first ear as said spring whereby the pressure within said actuator and the force of said spring are related to adjust the preload of said lever on said valve throughout the range of leveling afforded for the vehicle.

References Cited
UNITED STATES PATENTS 3,107,127 10/1963 Chevreux et al. _____ 303—22
3,362,758 1/1968 Goerke et al. _____ 303—22

MILTON BUCHLER, *Primary Examiner.*

J. J. McLAUGHLIN, *Assistant Examiner.*